United States Patent [19]
Richards

[11] 3,788,090
[45] Jan. 29, 1974

[54] FLUID CONTROL SYSTEMS

[75] Inventor: George B. Richards, Lake Forest, Ill.

[73] Assignee: Fluid Device Corporation, Highland Park, Ill.

[22] Filed: Apr. 5, 1972

[21] Appl. No.: 241,152

Related U.S. Application Data

[60] Division of Ser. No. 840,119, June 19, 1969, and a continuation-in-part of Ser. No. 724,385, April 26, 1968, abandoned.

[52] U.S. Cl. ..................... 62/139, 62/180, 62/201
[51] Int. Cl. ............................................. F25c 1/00
[58] Field of Search .............. 62/139, 180, 201, 390

[56] References Cited
UNITED STATES PATENTS

| | | | |
|---|---|---|---|
| 2,057,101 | 10/1936 | Kagi | 62/201 |
| 2,531,315 | 11/1950 | Wyllie | 62/201 |
| 3,443,394 | 5/1969 | Knonick | 62/139 |
| 3,552,136 | 1/1971 | Cook | 62/139 |

*Primary Examiner*—Meyer Perlin
*Attorney, Agent, or Firm*—Gerald D. Hosier

[57] ABSTRACT

Temperature control of fluid flowing within a system is accomplished by sensing a change in fluid pressure loss in the system, as occurs on transition of the fluid in state, e.g., from liquid to solid or gas, or vice versa. In the preferred form, a refrigeration means cools fluid flowing through a conduit within the system. A pressure responsive control includes a pressure sensor coupled to the conduit for detecting a change in pressure loss attendant a change in fluid state and a signal developing element for regulating operation of the refrigeration unit according to the sensed pressure change.

7 Claims, 3 Drawing Figures

FLUID CONTROL SYSTEMS

CROSS-REFERENCE TO RELATED APPLICATIONS

The present application is a division of copending application, Ser. No. 840,119, filed June 19, 1969, now U.S. Pat. No. 3,730,500, which in turn is a continuation-in-part of application, Ser. No. 724,385, filed Apr. 26, 1968, entitled "Liquid Level Control System and Carbonator," now abandoned.

The invention relates generally to fluid flow control or regulator systems. More particularly, the invention is directed to temperature control of liquid or other fluids flowing within a system by sensing a change in fluid pressure loss in the system, such as occurs on a state transition of the fluid from liquid to solid or gas, and vice versa. A more specific aspect of the invention is directed to an integral flow regulator-carbonator useful, for example, in a carbonated beverage dispensing system to maintain a circulating liquid at a chilled temperature approaching the freezing point of the liquid.

For convenience, the invention is illustrated only in the context of beverage dispensing systems, although those skilled in the art will recognize its more general utility, for example, in commercial air conditioning, heat exchanging and refrigerating systems.

SUMMARY OF THE INVENTION

The temperature control system of the invention provides an economical and reliable means for maintaining the temperature of a fluid flowing within a system at approximately the state transition temperature for the fluid, i.e., the temperature at which the fluid changes between gas, liquid or solid.

The present system is also highly sensitive to the change in pressure loss attendant an incipient change in state of the fluid and has a short time constant of operation.

In accordance with the present invention, a fluid control system comprises conduit means for conveying fluid through the system and refrigeration means for cooling fluid within the system. Pressure responsive control means having a pressure sensor coupled to the conduit means and having a signal developing element coupled to the refrigeration means are provided for applying a control signal to the refrigeration means to alter the cooling influence of the refrigeration means on the fluid within the system according to a sensed change in fluid pressure attendant a transition in state of the fluid in said conduit means.

In accordance with the more specific aspects of the invention, a beverage dispensing system of the type having a recirculation flow path comprises refrigeration means including a refrigeration coil for chilling the liquid within the chill tank. Conduit means are serially coupled in the recirculation flow path and adjacent the refrigeration coil for effecting a cooling of the liquid flow through the conduit means. A pressure responsive control means, having a pressure sensor coupled to the upstream end of the conduit means and a signal developing element coupled to the refrigeration means, is provided for effecting a reduction in the cooling influence of the refrigeration means in accordance with a sensed increase in pressure attendant transition of said liquid within said conduit means from a liquid to a partially frozen condition.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

DESCRIPTION OF THE PREFERRED EMBODIMENTS

Figure 1:
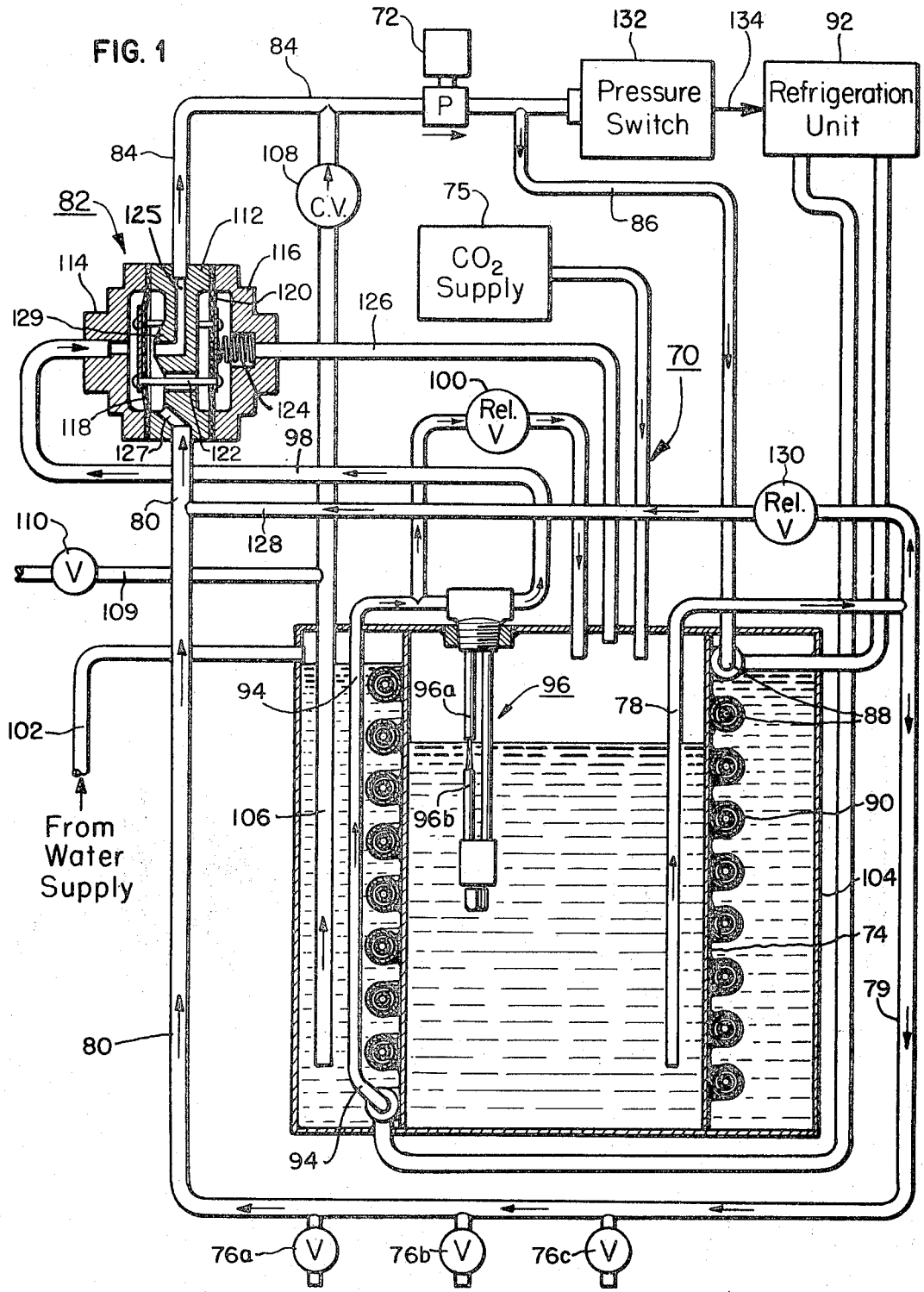
FIG. 1 is a semi-schematic illustration of a beverage dispensing system embodying the temperature control apparatus according to the present invention.

Referring now to FIG. 1, there is generally designated by the reference numeral 70 a preferred form of beverage dispensing system embodying the present invention. The system 70 comprises a liquid pump 72 and a recirculation means to continuously provide a flow of a cold, freshly carbonated liquid from a chill tank 74 past a series of dispensing heads 76a–76c. In this regard, the chill tank 74 is, of course, sealed and coupled to a pressurized supply of carbon dioxide 75 in conventional fashion.

More particularly, the recirculation means includes a chill tank outlet conduit 78 which is connected in shunt to the dispensing heads 76a–76c by a conduit 79 of extended length running from the main system apparatus to the fountain or dispensing area. A return flow path from the dispensers to the chill tank includes a return conduit 80, a differential pressure responsive valve means 82, and a conduit 84 connecting to the input or suction side of the pump 72. The output of pump 72 is coupled by a short conduit section 86 to the upper end of a helically configured conduit means that is wrapped about the chill tank 74. For reasons presently to be explained in greater detail, the helical conduit section 88 is coaxially supported within a similarly configured refrigeration coil 90. The opposite ends of the refrigeration coil 90 are connected by respective conduit sections to a conventional refrigeration unit 92 which continuously circulates a fluid coolant in the annulus defined by the region intermediate the coaxially aligned conduits 88 and 90.

The downstream end of the helical flow coil 88 is connected by a conduit stub section 94 to a flow inlet channel 96a of a fluid interaction means 96. The device 96 in the present embodiment is a fluid amplifier belonging to a class of such devices known generally as turbulent amplifiers. As will presently be explained in greater detail, the amplifier 96 provides a digital, fluid pressure output signal in response to displacement of the liquid level within the chill tank 74 to or from a predetermined sensing level.

The inlet flow channel 96a of the amplifier 96 completes the return flow path to the chill tank and the fluid which is ejected from a nozzle-like orifice of the inlet 96a develops a pressure signal by impingement on a fluid amplifier outlet means 96b which, as shown, is separated from the inlet by a predetermined free space. The outlet 96b of the amplifier 96 communicates with a closed cavity of the differential pressure responsive valve 82 through a connecting conduit 98. In order to maintain the pressure drop across the amplifier inlet channel 96a approximately constant, a spring biased pressure relief or check valve 100 is connected between the conduit stub 94 and the pressurized environment of the chill tank 74 thereby to partially bypass the amplifier inlet channel whenever the liquid at the inlet exceeds the pressure within the enclosed chill tank 74 by more than a predetermined value, in this instance 5 psi.

Any liquid that is tapped from the recirculation system is replenished by an appropriate addition of liquid from a water supply source or the like (not shown) which communicates with the system through an inlet conduit 102. In order to assure that the beverages dispensed from the system are always of a uniformly cold temperature, there is provided a tempering tank 104 for precooling the supply liquid prior to its introduction into the recirculation flow path. More particularly, the cylindrical tank 104 is mounted concentrically of the chill tank 74 in sealed relation therewith such that the annular space intermediate the tanks 74, 104 provides a closed, pressurized reservoir of liquid that is precooled to a desired, nominal temperature by contact with the refrigeration coils 90. As shown, the water supply inlet conduit 102 is connected to the top of the tempering tank adjacent one side thereof while an outlet conduit 106, having its open end remotely positioned from the inlet conduit 102 to assure that only cooled liquid is drawn from the tank, is connected by a double check valve arrangement 108 to the recirculation flow path of the system at a point along the conduit section 84, i.e., intermediate the outlet of valve 82 and the inlet or suction of pump 72. The tempering tank outlet conduit 106 is also connected by a conduit section 109 to a spigot 110 to provide a cold, fresh water tap from the system in addition to the beverage dispensing taps 76a-76c. The precooled supply liquid is introduced into the recirculation means through blockage of the recirculation flow path by operation of the valve 82 thereby causing the pump 72 to draw its prime from the tempering tank 104 through the outlet conduit 106 and the normally closed check valve 108.

The valve structure 82 of the present embodiment is of a double diaphragm type comprising an intermediate casing section 112 and a pair of end casing sections 114 and 116 which cooperate with respective opposed faces of the intermediate section 112 to support a pair of diaphragm members 118 and 120 in sandwiched relation between the respective casing sections. The diaphragm members 118 and 120 are connected for coordinated movement by a plurality of vertical posts or stays 122. A helical spring 124, captivated between the lower casing section 116 and the underside of the diaphragm 120, biases the diaphragm structure toward the casing section 114. The diaphragm members 118, 120 divide the interior cavity of the valve structure into two pressure chambers and an intermediate liquid flow passage. A first pressure chamber is coupled by the conduit 98 to receive a fluid pressure signal from the outlet means 96b of the amplifier 96. A second pressure chamber is maintained at a reference pressure equal to the pressure within the closed chill tank 74, e.g., 80-85 psi, by a connecting conduit 126. The flow passageway defined in the central valve casing section intermediate the diaphragms 118, 120 provides a normally open flow path from the inlet conduit 80, through an outlet passage 125 to the conduit section 84.

The valve structure 82 is illustrated with the diaphragms 118, 120 in their normal or open position thereby permitting unimpeded flow between the inlet conduit 80 and the outlet conduit 84. The valve structure 82 is, however, responsive to a fluid pressure signal from the amplifier 96 to displace the diaphragm 118, against the influence of the reference pressure communicated to the outside of the diaphragm 120 and the spring pressure 124, into secure engagement with an annular valve seat 129 of the casing section 112 thereby to interrupt the recirculation flow path.

Figure 1A:
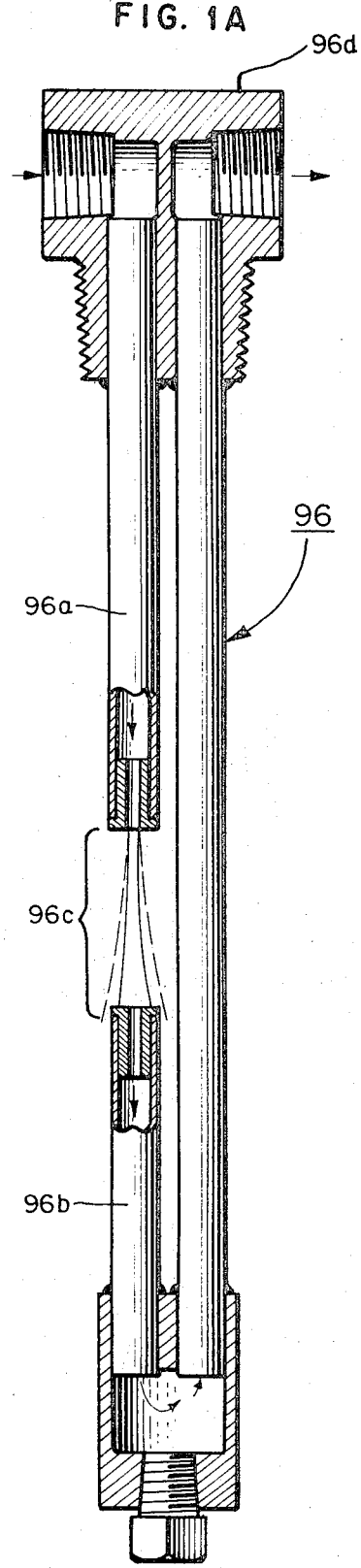
FIG. 1A is an enlarged view of the liquid level sensing device of the system of FIG. 1.

The fluid amplifier 96 for developing the afore-said fluid pressure signal is illustrated in detail in FIG. 1A. The amplifier 96 includes serially aligned inlet, interaction and outlet zones respectively comprising the inlet flow channel 96a, the free space 96c separating the inlet and outlet flow channels and the outlet flow channel 96b. As seen in the drawing, the outlet flow channel 96b is formed with an intermediate bight portion to return the liquid to the common inlet-outlet header structure 96d of the amplifier and thence to the first chamber of the pressure responsive valve 82. The terminus of the inlet flow channel 96a is restricted in crosssection by a plug which defines a nozzle-like orifice for directing the exit flow across the free space of the interaction region 96c toward an axially aligned and structurally similar orifice plug of the outlet flow channel 96b. As denoted in the drawing by the conically diverging solid lines extending between the inlet and outlet flow orifices, the jet exiting from the inlet flow conduit 96a normally diverges in a conical fashion to a limited extent before impingement on the orifice plug of the outlet conduit 96b thereby resulting in a correspondingly reduced unit outlet pressure in the outlet flow channel 96b.

To the extent above described, the amplifier 96 is conventional; however, it has been found that certain surprising and highly desirable results obtain on associating the amplifier 96 in a unique manner with a fluid reservoir. More particularly, the fluid amplifier 96 is positioned within a fluid reservoir or the like such that the axis of the fluid jet is transverse to the surface of the liquid therein and further such that the terminus of the inlet flow channel 96a is located at a point immediately above a desired liquid sensing level within the reservoir. With this arrangement, it has been found that the liquid jet flowing between the inlet and outlet orifices substantially maintains the illustrated solid line conical configuration for any fluid level in the reservoir lying below the predetermined sensing level. In other words, the fluid pressure in the outlet conduit 96b is reasonably constant as the liquid level within the reservoir moves upwardly from a point lying vertically below the orifice plug of the outlet conduit 96b through the free space of the interaction region 96c toward the sensing level which, as previously stated, lies immediately below the orifice plug of the inlet flow conduit 96a.

On the other hand, it has been observed that when the liquid level rises to or above the sensing level, the focus area of the jet, i.e., the cross-sectional area of the jet at the point of impingement on the plug orifice of the outlet conduit 96b, increases markedly as denoted by the dotted lines in the drawing thereby causing a corresponding reduction in the pressure in the outlet flow conduit 96b. By way of example, in one constructed embodiment of the fluid amplifier 96 wherein the orifice apertures were three thirty-seconds inch in diameter, the interaction region spacing 96c one inch and the liquid water under a pressure of approximately 5 psi, it was observed that the liquid jet normally diverged to a focus area of three-sixteenths of an inch but that at the sensing level the focus area increased almost instantaneously to three-eighths of an inch in diameter. In terms of fluid signal pressure, the foregoing increase in focus area resulted in a relative pressure change on the order of four to five times. It was further observed that the sensing level occurred at approximately 0.010 inch below the end of the plug in the inlet conduit 96a.

It is currently believed that the above-described operational characteristics are related to the differing character of the fluid entrained by the amplifier jet when the reservoir level is respectively below and at the sensing level. Specifically, at all liquid levels below the sensing level, the jet emerging from the nozzle orifice of the amplifier inlet 96a entrains only the surrounding gas within the pressurized chill tank. On the other hand, when the liquid reaches the sensing level, the gas within the tank is substantially precluded access to the jet, hence, the surrounding liquid is drawn toward entrainment with the jet. As a consequence of its greater mass, the liquid moves more slowly than the gas and thereby materially reduces the circumferential pressure around the jet, causing the jet to conically diverge from its normal configuration in the manner denoted schematically by the dashed lines in the drawing.

Returning now to FIG. 1, a bypass conduit means 128 is coupled in shunt to that portion of the recirculation flow path extending from the chill tank to the dispensers and returning to the valve 82. Specifically, the conduit 128 is coupled between the outlet flow conduit 78 of the chill tank 74 and that portion of the return conduit 80 immediately preceding the inlet of the valve 82. In order to perform its desired function as will be explained, the conduit section 128 is provided with a flow restricting device 130 which in the present embodiment constitutes a check valve set to open at a predetermined pressure differential, in this instance 4 psi. The check valve 130 is normally closed during recirculation of the liquid within the system but opens to provide an ancillary flow path whenever the pressure loss across the conduit section that it shunts exceeds the aforesaid predetermined value. This predetermined pressure loss occurs in certain instances when liquid is being tapped from the system through one or more of the dispensers 76a–76c and is most likely to occur with frequency in those installations where the dispensers are at an extended distance from the primary system apparatus as, for example, 200–300 feet or more.

Absent the shunt conduit, prior art systems have encountered difficulties in returning adequate fluid to the pump to maintain proper operation and pump cavitation has occurred with resultant noise and reduction in pumping efficiency which in turn further accentuated the efficiency loss and noise. According to the present invention, the relief valve 130 is set to open at a pressure differential such that the optimum pumping efficiency of the pump 72 is maintained. Thus, even though a portion of the liquid is shunted past the dispensers, the maximum amount of fluid still flows past the dispenser heads according to the capability of the pump 72.

As a further advantage of the bypass conduit and relief valve arrangement 128, 130, it has been found that the carbonated liquid passing through the conduit 128 will in fact flow through the return conduit section 80 to the dispenser heads in instances of high pressure loss in the line. Accordingly, the capability of the system to provide fluid to the dispensers during periods of maximum demand is in fact increased by use of the described bypass arrangement, rather than decreased as might initially be expected. For example, assuming the conduit running to the dispensers to be on the order of three-eigthths inch in diameter, the bypass and return flow path actually increases the effective diameter to that of two parallel three-eighths inch conduits or the equivalent of one one-half inch conduit. Thus, installations wherein the dispensers are positioned at an extended distance from the primary system apparatus may still employ the more economical three-eighths inch conduit but provide an effective operation equivalent to a system having the more expensive one-half inch conduit. Furthermore, the bypass arrangement assures that adequate liquid is always communicated to the fluid amplifier 96 for its proper operation.

In accordance with the present invention, the temperature of the circulating liquid is sensed and maintained at a predetermined constant temperature by use of a liquid pressure sensing arrangement including a pressure switch 132. More specifically, it is desired to maintain the carbonated liquid at a temperature just above its freezing point. To this end, the pressure switch 132 is connected to the upstream end of that portion of the recirculation flow condit in which the flowing liquid is at the lowest temperature within the system. In the present instance, the pressure switch 132 is coupled to immediately precede the helically configured flow conduit 88 that is concentrically supported within the refrigeration coil 90. Any partial freezing of the liquid flowing in the conduit section 88 results in an increased pressure at the sensor of the switch 132. This sensed pressure increase is utilized to effect temperature control by connecting a signal developing portion of the switch 132 to the refrigeration unit 92, as is schematically denoted in the drawing by the arrow 134. The signal from the pressure switch 132 is adapted to effect a reduction in the cooling influence of the refrigeration unit 92 according to the sensed pressure increase. By way of illustration, the pressure switch 132 may be used to turn-off the refrigeration compressor (not shown) for the duration of the high pressure condition or, alternatively, to regulate the temperature of the coolant flowing in the refrigeration coil 90 without shutting down the compressor.

The aforesaid pressure sensing of temperature may be utilized either as the primary temperature control of liquid within the system or as a secondary, fail-safe temperature control in those instances where the conventional sensing apparatus fails to adequately respond to the temperature reduction. In addition to a failure situation, a conventional temperature control of the type employing a sensing bulb, capillary tube and bellows switch or the like has a rather long time constant of operation and, accordingly, with rapid changes in liquid temperature freezing may occur and damage the system before the condition is sensed and operation of the refrigeration unit 92 appropriately regulated. The pressure switch 132, on the other hand, immediately responds to the formation of slush ice or the like within the helical conduit 88 to effect a correspondingly prompt control of the refrigeration unit 92.

In summarizing the overall operation of the beverage dispensing system 70, it is initially assumed that the system is in an equilibrium condition with the liquid in the chill tank 74 being at the sensing level immediately below the terminus of the inlet conduit 96a of the fluid amplifier 96 thereby to communicate a pressure signal to the left side of the diaphragm 118 which is low relative to the reference and spring pressure on the opposed diaphragm 120. Accordingly, the interconnected diaphragm structure 118, 120 is biased to the left to maintain the valve passageway connecting the flow conduits 80, 84 in an open condition, as is illustrated in the drawing. Under the assumed conditions, the chilled, carbonated liquid is continually circulated by the pump 72 in the closed loop flow path previously described and denoted schematically by the arrows in the drawing. Specifically, the pump 72 draws the cold, carbonated liquid from the chill tank 74 through the outlet conduit 78 and the relatively long conduit 79, past the dispensers 76a–76c, through the return conduit 80, the valve 82 and the conduit 84 to the inlet side of the pump 72. The return path to the chill tank 74 is completed by the outlet conduit 86 from the pump 72, the helical chilling coil 88, the connecting conduit section 94 and the inlet 96a of the fluid amplifier 96. Since the chill tank 74 is filled to the sensing level, a fluid pressure signal is not applied to the valve 82 and the valve passageway remains open. With the passageway open, an insufficient differential pressure exists across the double check valve 108 to open the valve. Hence, no water is introduced into the circulating flow path from the tempering tank 104.

As previously noted, the dispensers 76a–76c may be positioned at a substantial distance, such as 200–300 feet or more, from the main system apparatus; the provision of the helical flow coil 88 concentrically mounted within the refrigeration coil 90 assures continuous and rapid rechilling of the liquid to its original temperature immediately prior to its return to the chill tank 74. The temperature of the chilled liquid in the helical coil 88 is maintained near its freezing point by the refrigeration unit 92, the operation of which is regulated by the pressure switch 132 in the manner previously described. The intimate association of the flow conduit 88 and the concentric refrigeration coil 90 provides a means for rapidly rechilling the returning liquid thereby substantially obviating the problems associated with effecting the chilling solely by means of the association of the refrigeration coils with the comparatively large volume chill tank 74.

The liquid entering the system from the supply or tempering tank 104 also passes through the helical cooling coil 88 prior to introduction into the chill tank 74. The prechilling of the liquid within the tempering tank 104 combined with the rapid cooling effected during flow through the conduit 88 assures that the dispensed beverages will always be of a uniform, cold temperature despite exceptionally high demands on the system. More particularly, the liquid entering the recirculation system from the tempering tank 104 follows a flow path from the outlet conduit 106 through the normally closed check valve 108, the pump 72, the conduit section 86, the helical cooling coil 88 and the inlet 96a of the amplifier 96 enroute to the chill tank 74.

The system is conditioned to effect introduction of the supply liquid into the chill tank 74 whenever the liquid level therein falls below the predetermined sensing level as occurs on removal of liquid through one or more of the dispensers 76a–76c. Under this circumstance, the liquid jet exiting from the fluid amplifier inlet conduit 96a impinges on the outlet 96b with a narrowed focus as previously discussed thereby resulting in a substantially increased fluid pressure signal to the pressure chamber adjacent the diaphragm 118 of the differential pressure responsive valve 82. The diaphragm structure 118–120 correspondingly shifts to the right to block the recirculation flow path, in turn causing the pump 72 to draw its prime from the tempering tank 104 through the conduit 106 and the check valve 108. An abrupt and secure closure of the diaphragm 118 against the annular valve seat 129 is assured by having the pump suction coupled to the valve so as to draw the diaphragm into engagement with the valve seat. As soon as sufficient liquid enters the system to restore the liquid level in the chill tank to the sensing level, the fluid pressure signal of the amplifier 96 is abruptly reduced and the recirculation flow path through the valve 82 is reopened by displacement of the diaphragm structure 118, 120 to the left in the drawing.

The check valve 130 connected in shunt to the relatively long dispenser conduit section opens from time to time in accordance with the demands of the dispensers 76a–76c for the reasons and in the manner previously described. The relief valve 100 likewise operates intermittently to maintain the pressure drop across the amplifier inlet 96a below a predetermined pressure value.

Figure 2:
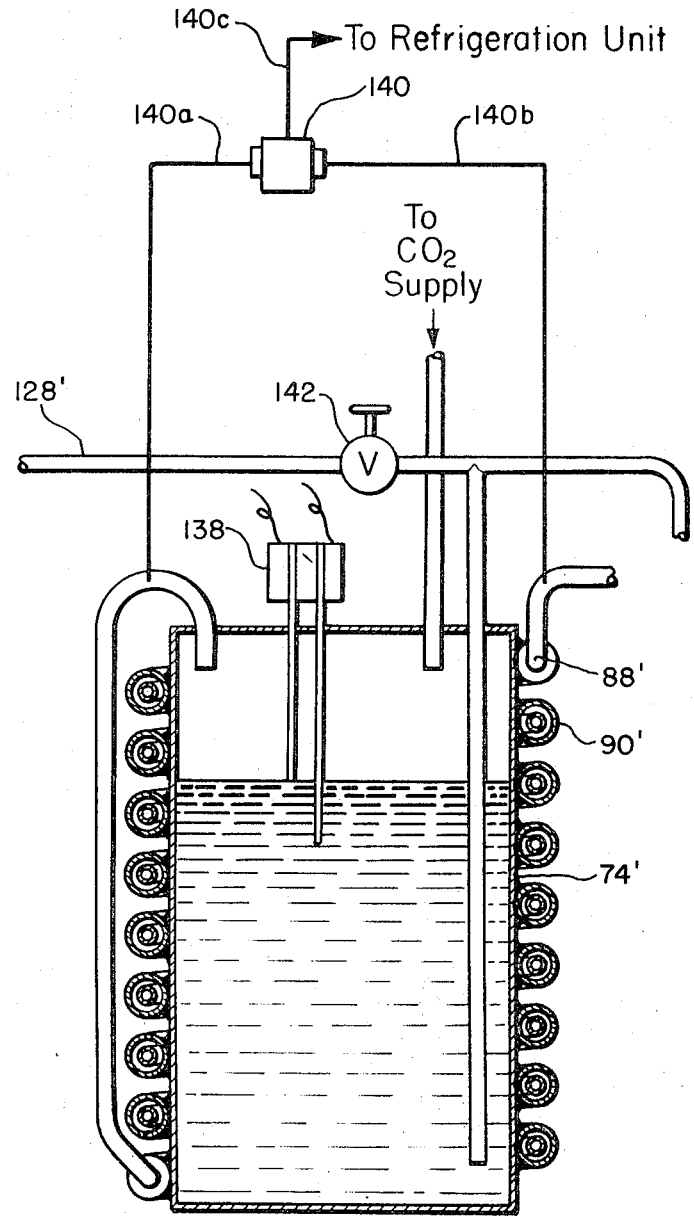
FIG. 2 is a partial schematic illustration of another beverage dispensing system illustrating an alternate embodiment of the liquid temperature control apparatus of the present invention.

A further embodiment of a beverage dispensing system incorporating an alternate embodiment of the invention is illustrated in FIG. 2; for simplicity and clarity of explanation, structural components of the system that may be identical to that previously described in connection with FIG. 1 are depicted by use of like reference numerals but with the addition of primes. The system of FIG. 2 unlike any of those previously described incorporates a conventional level sensor 138 of the dual level sensing variety. Specifically, the sensor 138 includes a pair of electrical probes projecting downwardly into the chill tank 74' with the probe elements terminating at respective vertically spaced levels therein. The sensor 138 operates in a conventional and well-known fashion to actuate a valve to admit liquid to the recirculation system whenever the liquid with the chill tank falls below the level of the lowermost electrode and closes the supply valve to institute recirculation of the liquid when the level within the tank is restored to a point in contact with the uppermost electrode. As pointed out earlier herein, such dual level systems have the disadvntage of causing substantial variations in the pressure within the system. In order to provide a liquid temperature control in accordance with sensed system pressure in such a circumstance, it is necessary to provide a control that is somewhat modified from that disclosed in the embodiment of FIG. 1. Specifically, a pressure switch 140 of FIG. 2 includes a pair of pressure sensing probes 140a and 140b that are connected to opposite ends of the helically configured flow coil 88' thereby to sense the pressure at the respective opposite ends of this flow coil. A terminal 140c of the pressure switch 140 provides an output that is proportional to the differential in pressure sensed by the elements 140a and 140b and this output is utilized to regulate the refrigeration unit in a manner previously described in connection with FIG. 1. Since the outpue 140c of the pressure switch 140 is related to a pressure differential as opposed to an absolute pressure, vaiations in system pressure are not detected but only pressure increases due to transition of the fluid within the helical coil 88' from a liquid to a partially frozen or slush ice condition.

The embodiment of FIG. 2 also illustrates a manually actuable valve 142 which may be connected in the bypass or shunt conduit 128' in place of the spring-loaded check valve 130 of FIG. 1. Although not preferred, the valve 142 or a simple orifice plug will operate in a manner generally similar to that previously described in connection with the check valve 130.

Although the flow and temperature control apparatus of the present invention has been illustrated and described only in the context of beverage dispensing systems, it will be recognized by those skilled in the art that it has far broader applications. For example, the invention finds utility in commercial air conditioning, heat exchanger and refrigeration systems wherein it is desired to maintain a circulating fluid at a temperature bordering on its state transition temperature, e.g., freezing point. The invention is also useful in systems of a non-recirculating type wherein a change in pressure loss attendant a state transition initiates a control function.

While particular embodiments of the invention have been shown and described, it is apparent that various changes and modifications may be made, and it is therefore intended in the following claims to cover all such modifications and changes as may fall within the true scope of this invention.

I claim:

1. In a beverage dispensing system of the type including a liquid supply source, a liquid chilling tank, beverage dispensing means and recirculation means defining a closed loop flow path including a liquid pump, said chilling tank and said dispensing means for continually circulating a chilled liquid to said dispensing means, the combination comprising:
    refrigeration means including a coolant fluid and a refrigeration coil for circulating said coolant fluid;
    conduit means serially coupled in said recirculation flow path and positioned closely adjacent and in intimate thermal contact with said refrigeration coil for normally effecting a cooling of the liquid flowing through said conduit means to a temperature below the freezing point of said flowing liquid;
    and pressure responsive control means having a pressure sensor coupled to the upstream end of said conduit means and having a signal developing element coupled to said refrigeration means for effecting a reduction in the cooling influence of said refrigeration means in accordance with a sensed increase in pressure attendant transition of said liquid within said conduit means from a liquid to a partially frozen condition for maintaining the temperature of said liquid at a temperature near the freezing point of said liquid.

2. The combination of claim 1 in which said signal developing element regulates flow of said coolant in accordance with the sensed pressure to maintain the circulating liquid in said conduit means at a predetermined temperature near the freezing point of said liquid.

3. The combination of claim 1 and including a temperature sensing means communicating with said conduit means at the downstream end thereof and having a signal developing element coupled to said refrigeration means for effecting a reduction in the cooling influence of said refrigeration means in accordance with a sensed decrease in temperature below a predetermined value, said temperature sensing means inherently having a predetermined long time constant of operation and said pressure responsive control means having a short time constant of operation for responding to rapid temperature reductions in said circulating liquid thereby to preclude freezing of said circulating liquid.

4. A fluid control system, comprising:
    conduit means for conveying fluid through said system;
    refrigeration means including a refrigeration coil in intimate thermal contact with said conduit means for normally cooling the conveyed fluid within said conduit means to a temperature below the state transition temperature of said conveyed fluid;
    and pressure responsive control means having a pressure sensor coupled to said conduit means and having a signal developing element coupled to said refrigeration means for applying a control signal to said refrigeration means to regulate the cooling influence of said refrigeration means on the conveyed fluid within said system according to a sensed change in fluid pressure attendant a transition in state of the fluid in said conduit means for maintaining said fluid in said conduit means slightly above its state transition temperature.

5. The fluid control system of claim 4 in which said pressure responsive control means is coupled to said conduit means at a location immediately upstream of the lowest fluid temperature portion of said conduit means.

6. The fluid control system of claim 5 wherein the fluid is a liquid and said pressure responsive control means senses the pressure change attendant a transition of said liquid between liquid and solid states.

7. The fluid control system of claim 6 in which said pressure responsive control means is of a pressure differential responsive type including a pair of pressure sensors coupled to said conduit means in predetermined spaced relation and signal developing element for developing a control signal representative of a predetermined differential in sensed pressure between said sensors.

* * * * *